Dec. 26, 1950     C. W. SMITH ET AL     2,535,167
AIRCRAFT WHEEL CENTERING MECHANISM

Filed June 11, 1948     2 Sheets-Sheet 1

INVENTORS.
CLOVIS W. SMITH
JOHN E. WARNER
BY Richard W. Treverton
ATTORNEY.

Dec. 26, 1950  C. W. SMITH ET AL  2,535,167
AIRCRAFT WHEEL CENTERING MECHANISM
Filed June 11, 1948  2 Sheets-Sheet 2

INVENTORS.
CLOVIS W. SMITH
JOHN E. WARNER
BY
Richard W. Treverton
ATTORNEY.

Patented Dec. 26, 1950

2,535,167

UNITED STATES PATENT OFFICE 2,535,167

AIRCRAFT WHEEL CENTERING MECHANISM

Clovis W. Smith, Worthington, and John E. Warner, Columbus, Ohio, assignors to Curtiss-Wright Corporation, a corporation of Delaware Application June 11, 1948, Serial No. 32,346

9 Claims. (Cl. 244—50)

This invention relates to landing gear for aircraft and particularly to an improved means for utilizing extension of the shock strut of the gear to align the landing wheel prior to landing contact, and, in the case of retractable gears, prior to raising of the gear into the well provided for it in the aircraft structure.

According to the invention the shock strut of the landing gear, comprising telescoping sections connected by a scissors linkage to hold them against relative rotation, is mounted for rotation as a unit relative to the aircraft for steering purposes; and the scissors linkage, which extends as the shock strut extends in the absence of ground load, is arranged to cooperate with a non-rotating cam element to rotate the compression strut into the desired alignment. When ground load is applied so that the strut compresses the cam element is disengaged with the result that the landing wheel is freed for steering or castering action. This arrangement meets the objectives of providing a very simple and light weight aligning means. Furthermore the invention provides an arrangement wherein the upper portion of the compression strut, which has angular movement only relative to the aircraft, may be readily connected with steering mechanism. In fact in a preferred form of the invention a steering motor is attached directly to a part of the landing gear and moves as a unit therewith during raising and lowering of the gear.

The foregoing and other objects and advantages of the invention will become apparent from the following description of the structure shown in the accompanying drawings, wherein.

Figure 1:
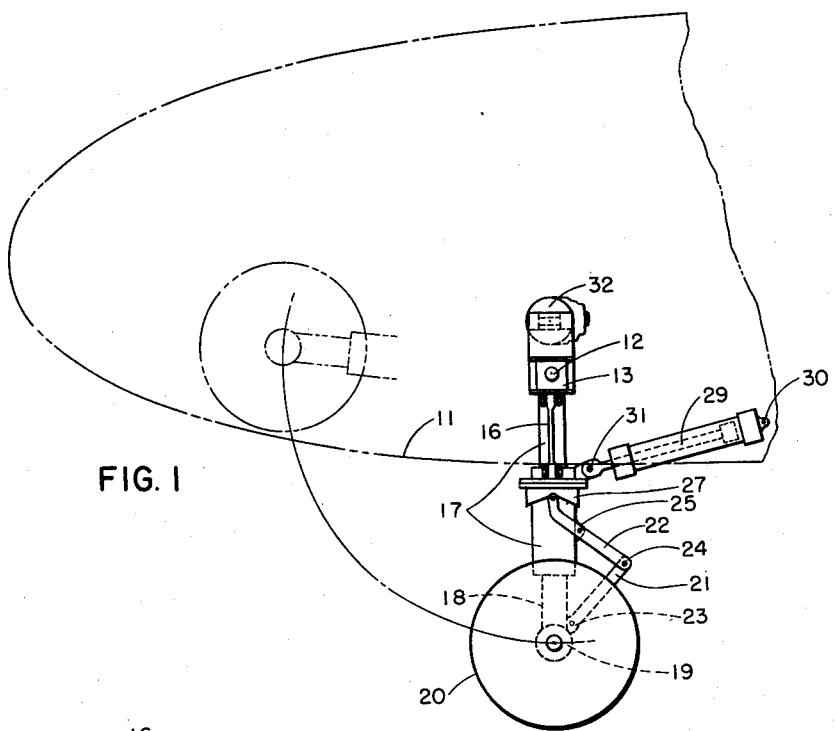
Figure 1 is a side elevation of the forward or nose landing gear of the airplane, the outline of the adjacent portion of the airplane fuselage being indicated by broken lines.

As shown in the drawings the aircraft 11 has pivoted thereto on a transverse axis 12 a yoke comprising a horizontal member 13 having at its center an upper bearing 14. The yoke further comprises a ring 15 which constitutes a lower bearing, the ring being secured to member 13 by diagonal members 16. Mounted for rotation in the bearings is the upper member 17 of an air-hydraulic shock strut which may be of any suitable internal construction. The lower part of the strut, designated 18, telescopes within member 17 and carries at its lower end a bearing 19 for the dual nose wheel assembly 20 of the airplane, this assembly including two wheels of which one is attached to each end of an axle extended through the bearing. The compression or shock absorbing strut 17, 18 is constructed, as is usual in struts of this kind, so that it will extend, by telescoping action of its upper and lower sections, in the absence of ground loads, as for example when the airplane is airborne, and so that it will contract when such ground loads are imposed upon it, as when the aircraft is on the ground. Telescoping action of the strut, resisted by the fluid which it contains, also acts as a shock absorbing spring suspension for the airplane when the latter is moving on the ground.

To enable such telescoping action of the shock strut sections while at the same time preventing relative rotation of them, a scissors linkage comprising links 21 and 22 is provided. Link 21 is pivoted at 23 to lower strut section 18 and at 24 to link 22, while the latter is pivoted at 25 to upper strut section 17. An extension of link 22 carries a cam follower in the form of a roller 26 for engagement, when the shock strut is extended, with a cam element 27 affixed to ring 15 of the yoke.

The cam face of element 27 is so shaped that upward thrust against it of the roller 26 will cause the roller, and the scissors linkage and compression strut and dual landing wheel, to rotate as a unit in bearings 14 and 15 to align the wheel so that it will track parallel with the longitudinal axis of the airplane. Such upward thrust of the roller 26 will occur when the shock strut 17, 18 is extended with resulting movement of link 22 about pivot 25 in a clockwise direction as the parts appear in Figures 1 and 2. When the shock strut is contracted the link 22 is rotated in the opposite direction, or counter-clockwise, carrying the roller 26 into disengaged relation to the cam 27 as indicated by the broken line position of the roller shown in Figure 2. In order that the landing wheel will be accurately aligned with the aircraft the face of cam 27 is provided with a centering recess 28. Once the roller is entered in this recess a substantial turning moment is required to rotate the wheel and shock strut assembly in bearings 14 and 15.

Figure 2:
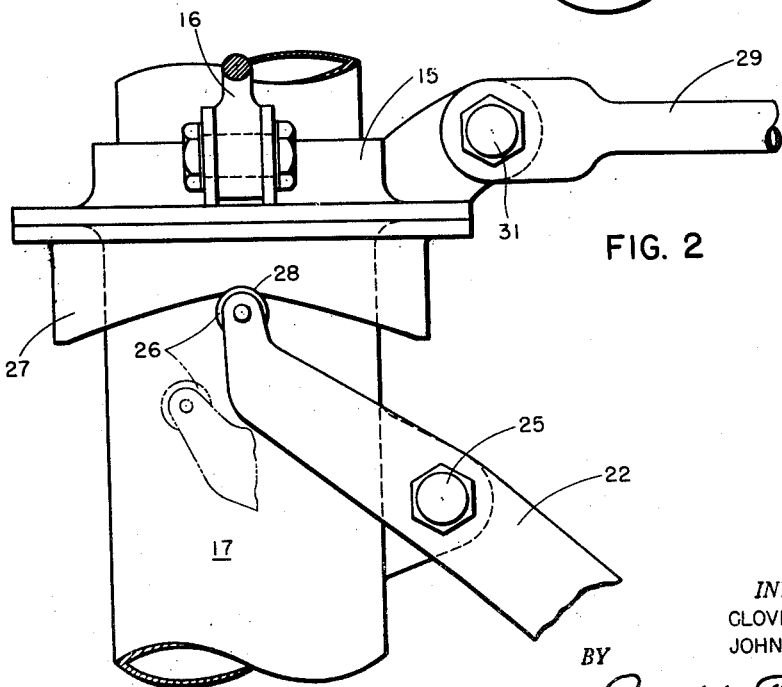
Figure 2 is a fragmentary detail side elevational view showing the relationship of the scissors linkage with the non-rotating cam means.

The assembly including the yoke, compression strut and landing wheels may be raised by being rotated by suitable means about the axis 12 from the upright landing position thereof shown in full lines to the position indicated in broken lines in Figure 1. Such means may comprise a hydraulic cylinder and piston unit 29 pivoted at 30 to the airplane and at 31 to the ring of the yoke, the unit extending to raise the gear and contracting to lower the gear.

Figure 3:
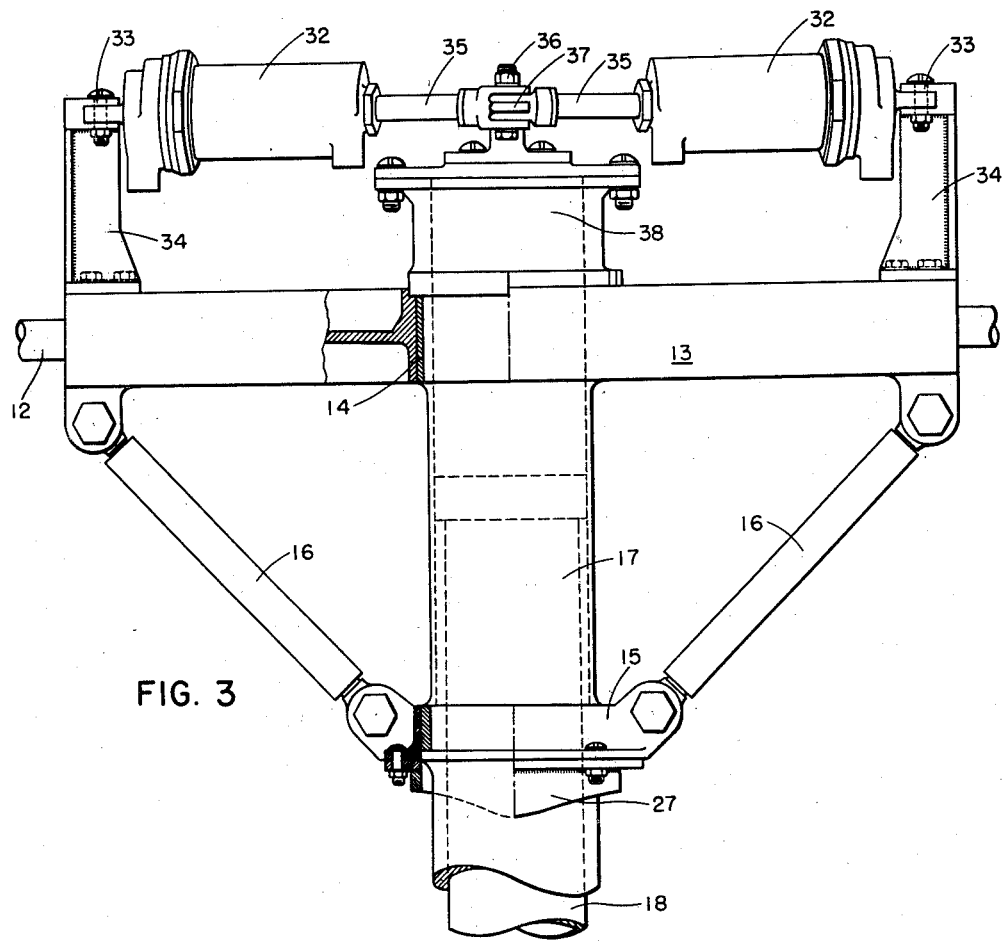
Figure 3 is a rear elevational view of the upper portion of the landing gear including the steering motor; and, Figure 4 is a fragmentary plan view showing certain details of the steering motor.
Figure 4:
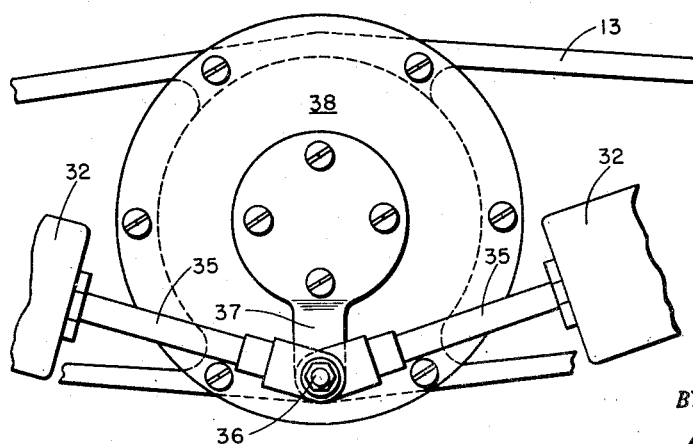

The steering mechanism shown in Figures 3 and 4 includes a pair of hydraulic cylinders 32 pivoted at 33 to upright extensions 34 on the yoke. Piston rods 35 of the pistons in the cylinders are connected by crank pin 36 to a crank arm 37 attached to the head 38 of the upper strut section 17. Hydraulic pressure may be applied in either direction to the opposite ends of the cylinders 32 through suitable flexible hydraulic lines (not shown) to rotate the crank arm 37 and the shock strut and wheel assembly in either direction in bearings 14 and 15 for steering the airplane on the ground. Suitable valve means for controlling such hydraulic steering mechanism may be associated in any desired manner with pilot operable control elements in the airplane. However, such valve means are not a part of the present invention and hence are not illustrated.

It will be understood that the structure and detail arrangement of parts herein described and illustrated in the accompanying drawings represent only one preferred embodiment of the inventive principles involved, and that these principles may be utilized in other physical formations and arrangements without departing from the spirit of the invention or from the scope of the appended claims.

We claim as our invention:

1. In a steerable and retractable aircraft landing gear, a yoke pivoted about a transverse axis to the aircraft, a shock strut having an upper section journalled in the yoke for turning about an axis that is substantially upright when the gear is lowered, said shock strut also having a lower section telescoping with respect to said upper section and carrying a landing wheel at the lower end thereof, a scissors linkage comprising pivotally connected links one of which is pivoted to the lower strut section and the other of which is pivoted to the upper strut section, a roller carried by the last mentioned one of the links, a wheel aligning cam mounted on said yoke and engaged by said roller when said shock strut is extended by the removal of ground load from the gear, a motor for turning the strut in the yoke for steering the aircraft on the ground, said motor comprising a cylinder and piston unit connected to and arranged to act between the yoke and the upper strut section, and means connecting and acting between the aircraft and said yoke for swinging the latter as a unit with said motor and shock strut and wheel about said transverse axis to raise the gear into retracted position within the aircraft.

2. In a steerable and retractable aircraft landing gear, a yoke pivoted to the aircraft about a substantially horizontal axis, a shock strut having an upper section journalled in the yoke for turning about an axis that is substantially upright when the gear is lowered, said shock strut also having a lower section telescoping with respect to said upper section and carrying a landing wheel at the lower end thereof, a scissors linkage comprising pivotally connected links one of which is pivoted to the lower strut section and the other of which is pivoted to the upper strut section, a cam follower on the last mentioned one of the links, a wheel aligning cam mounted on said yoke and engaged by said cam follower when said shock strut is extended by the removal of ground load from the gear, means acting between the yoke and strut for turning the latter in the yoke for steering the aircraft on the ground, and means connecting and acting between the aircraft and said yoke for swinging the latter as a unit with shock strut and wheel about said substantially horizontal axis to raise the gear into retracted position within the aircraft.

3. In a steerable aircraft landing gear, a shock strut having an upper section journalled in the aircraft for turning about a substantially upright axis and a lower section telescoping with respect to said upper section, a landing wheel carried by said lower section of the shock strut, a scissors linkage comprising pivotally connected links one of which is pivoted to the lower strut section and the other of which is pivoted to the upper strut section, a cam follower on the last mentioned one of the links, a wheel aligning cam mounted on the aircraft and engaged by said cam follower when said shock strut is extended by the removal of ground load from the gear, and a motor for turning the strut about said substantially upright axis for steering the aircraft on the ground, said motor comprising a cylinder and piston unit connected to and arranged to act between the aircraft and the upper strut section.

4. In a steerable aircraft landing gear, a shock strut having an upper section journalled in the aircraft for turning about a substantially upright axis and a lower section telescoping with respect to said upper section, a landing wheel carried by said lower section of the shock strut, a scissors linkage comprising pivotally connected links one of which is pivoted to the lower strut section and the other of which is pivoted to the upper strut section, a cam follower on the last mentioned one of the links, a wheel aligning cam mounted on the aircraft and engaged by said cam follower when said shock strut is extended by the removal of ground load from the gear, and means for turning the strut about said substantially upright axis for steering the aircraft on the ground, said means being arranged to act between the aircraft and the upper strut section.

5. In an aircraft landing gear, a shock strut having an upper section journaled in a bearing secured to the aircraft for turning about a substantially up-right axis and a lower section telescoping with respect to said upper section, a landing wheel carried by said lower section, an extensible linkage directly interconnecting said upper and lower sections of the shock strut, one part of said linkage being directly pivoted to said lower section and another relatively extensible part of the linkage being directly pivoted to said upper section whereby said shock strut is adapted to rotate as a unit about said up-right axis, and coacting cam and cam follower members associated with said shock strut for centering the same, one of said members being mounted in fixed relation to said upper section bearing and the other member being mounted on said extensible part of said linkage, said members being held in engagement by said linkage for centering said landing wheel with respect to the longitudinal axis of the aircraft when the shock strut is free of load, and said linkage causing the respective member connected thereto to move out of engagement with the coacting relatively fixed member for permitting castering of said landing wheel when said shock strut is compressed under ground load.

6. In a steerable aircraft landing gear, a shock strut having an upper section journalled in the aircraft for turning about a substantially upright axis and a lower section telescoping with respect to said upper section, a landing wheel carried by said lower section of the shock strut, a scissors linkage comprising pivotally connected links one of which is pivoted to the lower strut section and the other of which is pivoted to the upper strut section, a wheel aligning cam element and cam follower element, one of said elements being mounted on the aircraft in non-rotatable relation thereto about said substantially upright axis, and the other of said elements being carried by the link that is pivoted to the upper strut section, said elements being engaged to turn the shock strut about said axis to align the wheel when the shock strut is extended as the result of removal of ground load from the gear.

7. In a retractable aircraft landing gear, a yoke pivoted to the aircraft about a substantially horizontal axis, a shock strut having an upper section journalled in the yoke for turning about an axis that is substantially upright when the gear is lowered, said shock strut also having a lower section which telescopes with respect to said upper section and which carries a landing wheel at its lower end, a scissors linkage comprising pivotally connected links one of which is pivoted to the lower strut section and the other of which is pivoted to the upper strut section, a roller carried by the last mentioned of the links, a wheel aligning cam mounted on said yoke and engaged by said roller when said shock strut is extended by the removal of ground load from the gear, and means comprising an hydraulic cylinder and piston unit connected and acting between the aircraft and said yoke for swinging the latter together with said strut and wheel about said substantially horizontal axis to raise the gear into retracted position within the aircraft.

8. In a retractable aircraft landing gear, a yoke pivoted to the aircraft about a substantially horizontal axis, a shock strut having an upper section journalled in the yoke for turning about an axis that is substantially upright when the gear is lowered, said shock strut also having a lower section telescoping with respect to said upper section and carrying a landing wheel at the lower end thereof, a scissors linkage comprising pivotally connected links one of which is pivoted to the lower strut section and the other of which is pivoted to the upper strut section, a roller carried by the last mentioned of the links, a wheel aligning cam mounted on said yoke and engaged by said roller when said shock strut is extended by the removal of ground load from the gear, and means acting between the aircraft and said yoke for swinging the latter together with said strut and wheel about said substantially horizontal axis to raise the gear into retracted position within the aircraft.

9. In a retractable aircraft landing gear, a yoke pivoted to the aircraft about a substantially horizontal axis, a shock strut having an upper section journalled in the yoke for turning about an axis that is substantially upright when the gear is lowered, said shock strut also having a lower section telescoping with respect to said upper section and carrying a landing wheel at the lower end thereof, a scissors linkage comprising pivotally connected links one of which is pivoted to the lower strut section and the other of which is pivoted to the upper strut section, a wheel aligning cam element and cam follower element, one of said elements being mounted on said yoke and the other on the link that is pivoted to the upper strut section, said elements being engaged to turn the shock strut in the yoke to align the wheel when the shock strut is extended as the result of removal of ground load from the gear, and means acting between the aircraft and said yoke for swinging the latter together with said strut and wheel about said substantially horizontal axis to raise the gear into retracted position within the aircraft.

CLOVIS W. SMITH.
JOHN E. WARNER.

REFERENCES CITED

The following references are of record in the file of this patent:

UNITED STATES PATENTS

| Number | Name | Date |
|---|---|---|
| 2,394,496 | Stephan | Feb. 5, 1946 |